United States Patent [19]

Anczurowski

[11] Patent Number: 4,650,421
[45] Date of Patent: Mar. 17, 1987

[54] REPRESENTATION OF COLOR FOR BLIND PERSONS

[76] Inventor: Edward Anczurowski, 2450 Avongate Drive, Mississauga, Ontario, Canada, L5C 2X6

[21] Appl. No.: 733,252

[22] Filed: May 13, 1985

[51] Int. Cl.$^4$ .............................................. G09B 21/00
[52] U.S. Cl. ...................................... 434/113; 430/44
[58] Field of Search .................. 434/113, 114; 430/42, 430/44

[56] References Cited

U.S. PATENT DOCUMENTS

| | | | |
|---|---|---|---|
| 2,986,466 | 5/1961 | Kaprelian | 430/44 |
| 3,667,139 | 6/1972 | Barr | 434/113 |
| 4,135,927 | 1/1979 | Draugelis et al. | 430/44 |

FOREIGN PATENT DOCUMENTS

| | | | |
|---|---|---|---|
| 132672 | 4/1933 | Austria | 434/113 |
| 2011145 | 7/1979 | United Kingdom | 434/113 |

OTHER PUBLICATIONS

"Xerographic Reproduction of Color for the Blind", Xerox Research Center of Canada, May 24, 1984.
"A Nice Touch", Article in Office Administration and Automation", pp. 21-22, Jul. 1983.
"Photocopier Produces Raised-Relief Braille Copies" Data Unknown.

Primary Examiner—William H. Grieb
Attorney, Agent, or Firm—Sim & McBurney

[57] ABSTRACT

The convention is established and made known to a blind person that a first set of substantially parallel first lines oriented on a substrate in a first direction represents a first color, a second set of substantially parallel second lines oriented on the substrate in a second direction represents a second color and a third set of substantially parallel third lines oriented on the substrate in a third direction represents a third color. The three colors are different from each other and, when mixed together in different combinations, provide other different colors. The three colors may be magenta, cyan and yellow from which green, purple and red can be derived by various combinations of two of the three basic colors and black from all three. The three directions are different from each other, e.g., horizontal, 60° and 120°. In the area of the substrate where color is to be represented, one or more of the three sets of lines oriented in its or their respective direction or directions is or are provided depending on the color to be represented, these lines being constructed and arranged to be capable of being sensed by the fingers of a blind person.

28 Claims, 11 Drawing Figures

REPRESENTATION OF COLOR FOR BLIND PERSONS

BACKGROUND OF THE INVENTION

The braille system has been in use since about 1829 and enables blind persons to touch read and write. The braille code consists of six dots numbered from one to six in a group known as a braille cell. By convention, each letter of the alphabet has a different number pattern of dots. Likewise numbers and punctuation are represented in braille code.

The printing of braille is accomplished by impressing dots in paper using a mechanical typewriter. Duplication of braille print is slow and expensive involving the creation and use of an embossing aluminum master which is employed to impress braille characters in paper.

While braille is suitable for representing letters, numbers and punctuation, the inventor is not aware of any suitable technique ever having been developed for conveying color recognition to a blind person.

Of course, persons who have been blind since birth have no appreciation for or understanding of color, but this is not the case with respect to persons who became blind later in life.

Color is an important factor in communication among sighted people. It is used, for example, to present maps, engineering drawings, statistics, geometrical figures and many other types of information, and it would be desirable to provide the blind with a system for color recognition.

An object of an aspect of this invention is to provide a color recognition system for blind persons.

An object of an aspect of this invention is to provide a color recognition system for blind persons which can be effected using modern equipment, such as a xerographic black and white or color copier, but which also can be effected by embossing or other techniques, if desired.

SUMMARY OF THE INVENTION

Various aspects of the invention are as follows:

For use in representing color to a blind person, the provision on a substrate in superimposed relationship to each other of at least two sets of a first set of substantially parallel first lines, a second set of substantially parallel second lines and third set of substantially parallel third lines, the orientation of said first, second and third sets on said substrate by convention known to the blind person representing three different colors which, when mixed together in different combinations, provide other different colors, said first, second and third sets of lines extending in three different directions with respect to each other, said lines being capable of being sensed by the fingers of the blind person.

A method for representing color to a blind person in which a convention has been established and is known to the blind person that a first set of substantially parallel first lines oriented on a substrate in a first direction represents a first color, a second set of substantially parallel second lines oriented on said substrate in a second direction represents a second color and a third set of substantially parallel third lines oriented on said substrate in a third direction represents a third color; said first, second and third colors being different from each other and, when mixed together in different combinations, providing other different colors; said first, second and third directions being different from each other; comprising providing on said substrate in superimposed relationship to each other and in an area where color is to be represented at least two sets of said first, second and third sets of lines oriented in their respective directions and constructed and arranged to be capable of being sensed by the fingers of the blind person.

A method for representing color to a blind person in which a convention has been established and is known to the blind person that a first set of substantially parallel first lines oriented on a substrate in a first direction represents a first color, a second set of substantially parallel second lines oriented on said substrate in a second direction represents a second color and a third set of substantially parallel third lines oriented on said substrate in a third direction represents a third color; said first, second and third colors being different from each other and, when mixed together in different combinations, providing other different colors; said first, second and third directions being different from each other; comprising providing on said substrate in an area where color is to be represented said first, second and third sets on lines oriented in their respective directions and constructed and arranged to be capable of being sensed by the fingers of the blind person, said first, second and third sets of lines being provided on said substrate by selectively exposing three times to light an original to be copied on said substrate, once using a filter for said first color and a screen having said first lines to produce a first image, a second time using a filter for said second color and a screen having said second lines to produce a second image and a third time using a filter for said third color and a screen having said third lines to produce a third image.

BRIEF DESCRIPTION OF THE DRAWINGS

This invention will become more apparent from the following detailed description, taken in conjunction with the appended drawings, in which.

Figure 1:
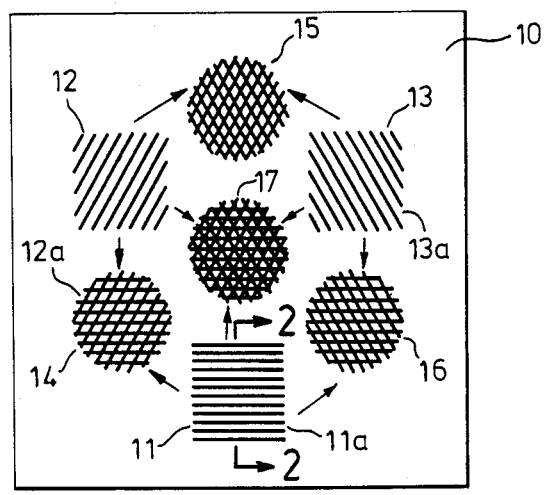
FIG. 1 is a "color" chart indicating how different colors can be represented by different sets of lines.

Referring first to FIG. 1, which illustrates the essence of this invention, it is well known that a number of different colors can be created by mixing various combinations of three primary colors. For example, any color can be represented by mixing the three primary colors magenta, cyan and yellow, the hue of the desired color depending on the relative proportion of the three primary colors.

In accordance with an aspect of this invention, each primary color is represented by a set of parallel lines, and the various sets are oriented at different angles to each other. Thus, and strictly by way of example, there is shown a substrate 10 in FIG. 1, e.g., a piece of paper, on which there is a first set of horizontal lines 11 that represents magenta, a second set of lines 12 that represents cyan and a third set of lines 13 that represents yellow. This convention is established and is made known to blind persons, i.e., that horizontal lines 11 represent magenta, inclined lines 12 represent cyan and inclined lines 13 represent yellow.

Figure 2:
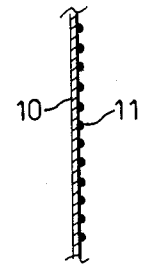
FIG. 2 is a section taken along line 2—2 in FIG. 1.

The orientation of the three sets of lines is different, so that their direction can be sensed by touch, and, to this end, and as shown in FIG. 2, the lines are raised above substrate 10, as will be discussed herein later.

Strictly by way of example, although in the preferred embodiment, lines 12 are at 60° to the horizontal (lines 11) and lines 13 are at 120° to the horizontal. Other angles could be employed, but 0°, 60° and 120° gives the greatest angular separation between the lines when they are put together and, hence, facilitates determination by touch as to which lines are present when two or more of the sets of lines 11, 12 and 13 are used.

Cyan and magenta combine to form purple, and thus purple is represented on the "color" chart at 14 by sets of lines 11 and 12. Likewise green is represented on the "color" chart at 15 by sets of lines 12 and 13 (cyan and yellow) and red is represented on the "color" chart at 16 by sets of lines 11 and 13 (magenta and yellow). Black is formed by magenta, cyan and yellow and thus is represented on the "color" chart at 17 by sets of lines 11, 12 and 13.

As previously noted, the lines are such as to be capable of being sensed by the fingers of a blind person, and the appropriate lines are placed on substrate 10 in an area where color is to be represented such that when a blind person who knows of the convention that has been established feels the lines, that person can determine from the orientation of the lines whether magenta, purple, cyan, green, yellow, red or black is being represented.

The lines 11, 12 and 13 all may be of any desired color or colors. For example, they all may be black and may be formed of the black toner of a black and white copier. On the other hand, if the "color" chart of FIG. 1 is produced in a color copier, lines 11, 12 and 13 may be magenta, cyan and yellow respectively, such that, to a sighted person, these respective colors will appear at areas 11a, 12a and 13a respectively in FIG. 1, while the colors purple, green, red and black will appear to a sighted person at areas 14, 15, 16 and 17 respectively.

Many techniques may be employed for creating lines 11, 12 and 13. For example, they may be embossed in a paper substrate in the same manner in which braille printing has been accomplished for years. This would be a laborious, expensive and time-consuming technique, however, and thus is not the preferred technique.

A preferred technique involves the use of screens or masks to give the various sets of lines 11, 12 and 13 and color separation techniques.

Figure 3A:
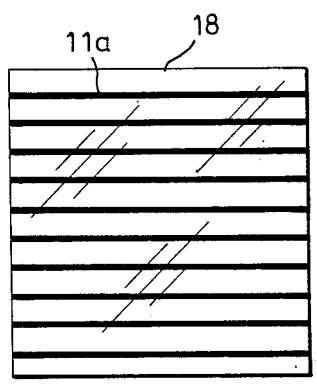
FIGS. 3A, 3B and 3C illustrate screens which may be used in the practise of an aspect of the invention to create the "color" chart of FIG. 1 or any "color" reproduction of an original.
Figure 3B:
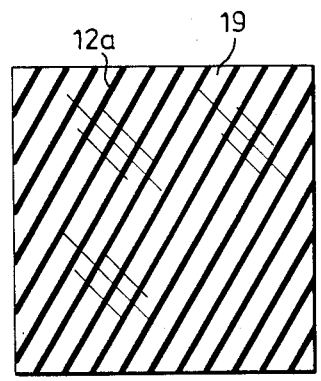
Figure 3C:
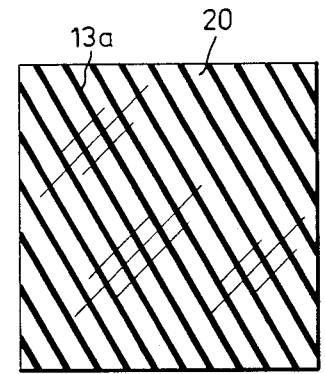

Referring to FIGS. 3A-3C there are shown three screens or masks 18, 19 and 20 that are lined to represent magenta, cyan and yellow respectively. These screens are simple transparencies on which opaque, white lines 11a, 12a and 13a corresponding to lines 11, 12 and 13 respectively are provided, e.g., by a normal printing operation.

If a color original is exposed to white light, and the reflected light from the original is passed through a red filter, only the cyan component, if any, of the original, will pass through the red filter. Likewise, by employing green and blue filters the magenta and yellow components, if any, of the original, can be obtained. If, in conjunction with the red, green and blue filters, the reflected light is passed through screens 19, 18 and 20, the result will be the obtaining of the magenta, cyan and yellow components of the original represented by lines 11, 12 and 13 respectively derived from screens 18, 19 and 20 respectively.

Figure 4:
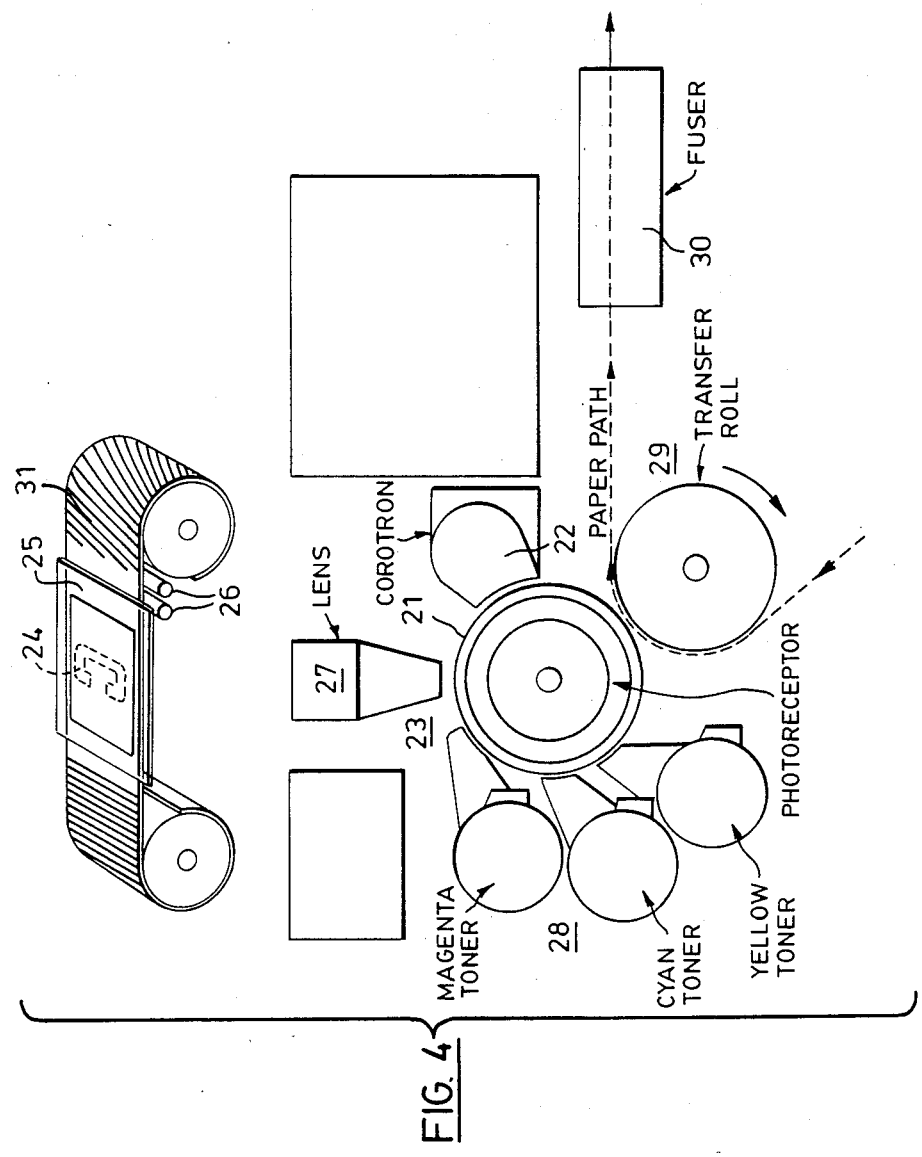
FIG. 4 is a schematic representation of a xerographic color copier that may be used in the practise of an aspect of this invention, e.g., to produce the "color" chart of FIG. 1.

Referring to FIG. 4, one specific technique for creating colors for recognition by the blind is shown. In FIG. 4 a color copier of the xerographic type is schematically illustrated. Such copiers are well known and will not be described in detail. However, the copier includes a rotatable, photoreceptor drum (or belt) 21; a charging station 22 at which drum 21 may be appropriately electrically charged, e.g., by means of a corotron; an imaging station 23 at which an electrostatic image of the original (shown at 24 on a platen 25) may be created on a drum 21 by an optical system involving a movable lens 27 and red, green and blue filters (not shown but associated with lens 27); a developing station 28 at which magenta, cyan and yellow toners can be selectively and sequentially applied to develop the latent electrostatic image on drum 21; a transfer station 29 at which the developed image can be transferred from drum 21 to a suitable substrate, e.g., paper; and a fuser station 30 at which the magenta, cyan and yellow toners are simultaneously fused.

The conventional color copier of FIG. 4 is modified, as shown in that Figure, and in FIGS. 5A-5E, by the inclusion between light source 26 and platen 25 of a movable belt 31 driven by any suitable means, e.g., a stepping motor (not shown), that has on it or is constituted by screens 18-20 (FIGS. 3A-3C) mounted side-by-side.

Referring now to FIG. 5, the steps for creating an image of the cyan component of original 24 will be described.

Figure 5A:
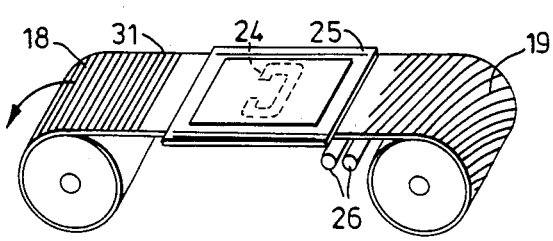
FIGS. 5A–5E schematically indicate steps in the creation of one "color" using the color copier of FIG. 4.
Figure 5B:
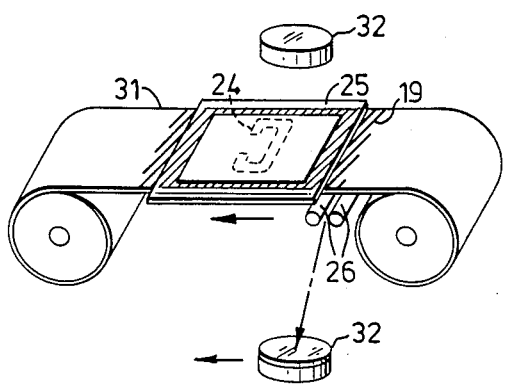
Figure 5C:
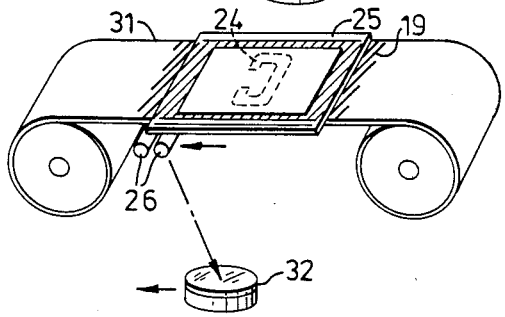
Figure 5D:
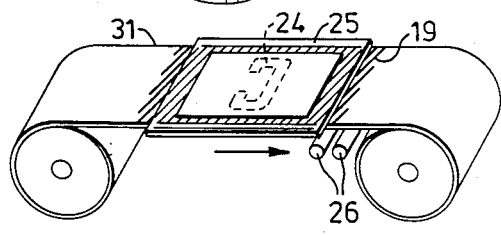
Figure 5E:
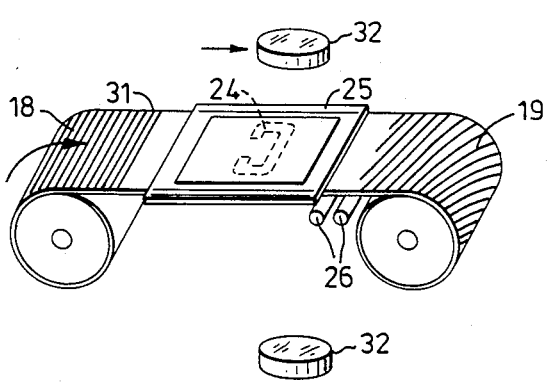

As shown in FIG. 5A, belt 31 is moved to remove screen 18 (the pattern for magenta) from beneath platen 25 and place screen 19 (the pattern for cyan) under platen 25 (FIG. 5B). Original 24 then is exposed to light from light source 26 through screen 19 and the reflected light is passed through a red filter 32 that is associated with lens 27. Light source 26, lens 27 and filter 32 all are moved in synchronism, and the complete original is scanned. This creates an image on photoreceptor 21 that is lined like screen 19 and which is developed using cyan toner.

In the same manner the magenta and yellow components of the original can be reproduced using screens 18 and 20 (not shown) on or of belt 31 and green and blue filters (not shown) associated with lens 27, the magenta and yellow toners respectively being employed to develop the latent electrostatic images. In other words, the original is exposed three times using the red, green and blue filters and screens 19, 18 and 20 respectively, the three images are developed using cyan, magenta and yellow toners respectively, and the transferred toner image on the transfer paper than is fused in fuser 30.

Of course, if it is not desired or necessary to produce a color reproduction of the original black toners can be used at developing station 28 in place of the magenta, cyan and yellow toners.

An ordinary black and white xerographic copier also may be used for creating a color pattern recognizable to a blind person. Such a copier would have to be modified by the use of a belt such as 31 having superimposed thereon red, green and blue filters in registry with screens 19, 18 and 20 respectively, and by the use of a stronger light source similar to that used in color copiers. The original then would have to be exposed three times through the different filter/screen combinations and processed through the copier each time. Provided that proper attention is paid to registration, this will effectively superimpose the three images on the copy.

Lines 11, 12 and 13 (FIG. 1) must be capable of being sensed by the fingers of a blind person. One way to achieve this objective is to employ expandable toners which, as such, are known in the art. These toners, when fused, swell up, and the amounts thereof that are deposited can be regulated taking their degree of expansion into consideration to produce "raised" lines of appropriate depth to be capable of being sensed by a blind person. Where expandable toners are used, the hue of the color being reproduced by lines 11, 12 and 13 will be proportionate to the depth and thickness of the lines. For example, colors between magenta and red will be represented by lines 11 and 13 with lines 11 being of progressively less depth and thickness going toward red and lines 13 being of even less depth and thickness between red and magenta, lines 11 and 13 being of equal depth and thickness when red is being portrayed.

Alternatively, known expandable papers (the substrate) can be used. In this case the copy is made using, preferably, black toner on a paper which has been coated with light-sensitive microcapsules. Developing is achieved by exposing the copy to long wavelength light which heats the microcapsules under the toner to a greater extent than elsewhere, because of the greater tendency of the black toner to heat, causing the microcapsules under the toner to expand and producing the required raised relief.

While the instant invention can be used to reproduce any color original, obviously it will be difficult to produce a meaningful copy of an original having in a small area many changes of hues and/or colors. The invention is particularly useful, however, in cases where large areas or blocks of solid colors are to be reproduced.

While preferred embodiments have been described and illustrated herein, the person skilled in the art will appreciate that changes and modifications may be made therein without departing from the spirit and scope of this invention as defined in the appended claims.

I claim:

1. For use in representing color to a blind person, the provision on a substrate in superimposed relationship to each other of at least two sets of a first set of substantially parallel first lines, a second set of substantially parallel second lines and third set of substantially parallel third lines, the orientation of said first, second and third sets on said substrate by convention known to the blind person representing three different colors which, when mixed together in different combinations, provide other different colors, said first, second and third sets of lines extending in three different directions with respect to each other, said lines being raised above the surface of said substrate and thereby being capable of being sensed by the fingers of the blind person.

2. The invention according to claim 1 wherein said first, second and third sets of lines represent magenta, cyan and yellow respectively.

3. The invention according to claim 2 wherein said second set of lines are at about 60° to said first set of lines and said third set of lines are at about 120° to said first set of lines.

4. The invention according to claim 2 wherein two of said sets of lines are provided on said substrate representing colors selected from green, purple and red.

5. The invention according to claim 4 wherein said second set of lines are at about 60° to said first set of lines and said third set of lines are at about 120° to said first set of lines.

6. The invention according to claim 2 wherein three sets of lines are provided on said substrate in superimposed relationship to each other representing the color black.

7. The invention according to claim 1 wherein said second set of lines are at about 60° to said first set of lines and said third set of lines are at about 120° to said first set of lines.

8. The invention according to claim 1 wherein said three sets of lines are provided on said substrate in superimposed relationship to each other.

9. The invention according to claim 1 wherein said first, second and third sets of lines are magenta, cyan and yellow respectively.

10. The invention according to claim 9 wherein said second set of lines are at about 60° to said first set of lines and said third set of lines are at about 120° to said first set of lines.

11. The invention according to claim 1 wherein said lines are formed by toner.

12. The invention according to claim 1 wherein said lines are embossed in said substrate.

13. The invention according to claim 1 wherein said lines are formed by expansion of parts of said substrate by heat.

14. A method for representing color to a blind person in which a convention has been established and is known to the blind person that a first set of substantially parallel first lines oriented on a substrate in a first direction represents a first color, a second set of substantially parallel second lines oriented on said substrate in a second direction represents a second color and a third set of substantially parallel third lines oriented on said substrate in a third direction represents a third color; said first, second and third colors being different from each other and, when mixed together in different combinations, providing other different colors; said first, second and third directions being different from each other; comprising providing on said substrate in superimposed relationship to each other and in an area where color is to be represented at least two sets of said first, second and third sets of lines oriented in their respective directions and being raised above the surface of said substrate, thereby being capable of being sensed by the fingers of the blind person.

15. The method according to claim 14 wherein said first, second and third sets of lines represent magenta, cyan and yellow respectively.

16. The method according to claim 15 wherein said second set of lines are at about 60° to said first set of lines and said third set of lines are at about 120° to said first set of lines.

17. The method according to claim 14 wherein said second set of lines are at about 60° to said first set of lines and said third set of lines are at about 120° to said first set of lines.

18. The method according to claim 14 further including providing on said substrate in superimposed relationship to said two sets and in said area where color is to be represented another set of said first, second and third sets of lines oriented in its respective direction and constructed and arranged to be capable of being sensed by the fingers of the blind person.

19. The method according to claim 18 wherein said first, second and third sets of lines represent magenta, cyan and yellow respectively and said first, second and third sets of lines together represent black.

20. The method according to claim 19 wherein said second set of lines are at about 60° to said first set of lines and said third set of lines are at about 120° to said first set of lines.

21. The method according to claim 14 wherein said first, second and third sets of lines represent magenta, cyan and yellow respectively and said two sets of said first, second and third sets of lines represent at least one of green, purple and red.

22. The method according to claim 21 wherein said second set of lines are at about 60° to said first set of lines and said third set of lines are at about 120° to said first set of lines.

23. The method according to claim 14 wherein said lines are formed by toner.

24. The method according to claim 14 wherein said lines are embossed in said substrate.

25. The method according to claim 16 wherein said lines are formed by expansion of parts of said substrate by heat.

26. A method for representing color to a blind person in which a convention has been established and is known to the blind person that a first set of substantially parallel first lines oriented on a substrate in a first direction represents a first color, a second set of substantially parallel second lines oriented on said substrate in a second direction represents a second color and a third set of substantially parallel third lines oriented on said substrate in a third direction represents a third color; said first, second and third colors being different from each other and, when mixed together in different combinations, providing other different colors; said first, second and third directions being different from each other; comprising providing on said substrate in an area where color is to be represented said first, second and third sets of lines with at least two of said sets of lines being in superimposed relationship to each other, said lines being oriented in their respective directions and being raised above the surface of said substrate, thereby being capable of being sensed by the fingers of the blind person, said lines being provided on said substrate by selectively exposing three times to light an original to be copied on said substrate, once using a filter for said first color and a screen having said first lines to produce a first image, a second time using a filter for said second color and a screen having said second lines to produce a second image and a third time using a filter for said third color and a screen having said third lines to produce a third image.

27. The method according to claim 26 including the steps of developing said images, transferring the same to said substrate and fixing said images on said substrate.

28. The method according to claim 27 wherein toner is employed to develop said images and said images are fixed to said substrate by fusing said toner.

* * * * *